(12) United States Patent
Waclawsky et al.

(10) Patent No.: US 7,477,601 B1
(45) Date of Patent: *Jan. 13, 2009

(54) METHODS AND APPARATUS FOR MANAGING A FLOW OF PACKETS USING CHANGE AND REPLY SIGNALS

(75) Inventors: John G. Waclawsky, Fredrick, MD (US); Hamesh Chawla, San Leandro, CA (US)

(73) Assignee: Cisco Technology, Inc., San Jose, CA (US)

( * ) Notice: Subject to any disclaimer, the term of this patent is extended or adjusted under 35 U.S.C. 154(b) by 911 days.

This patent is subject to a terminal disclaimer.

(21) Appl. No.: 10/635,116

(22) Filed: Aug. 6, 2003

Related U.S. Application Data (63) Continuation of application No. 09/340,524, filed on Jun. 28, 1999, now Pat. No. 6,628,610.

(51) Int. Cl.
*H04L 12/26* (2006.01)

(52) U.S. Cl. ................. 370/232; 370/231; 370/236; 370/395.21

(58) Field of Classification Search ............. 370/229, 370/230, 231, 232, 235, 236, 255, 312, 352, 370/395.21, 432, 472
See application file for complete search history.

(56) References Cited

U.S. PATENT DOCUMENTS

| | | | | |
|---|---|---|---|---|
| 5,193,151 A | | 3/1993 | Jain | 709/237 |
| 5,367,523 A | | 11/1994 | Chang et al. | 370/235 |
| 5,377,327 A | | 12/1994 | Jain et al. | 709/235 |
| 5,491,801 A | | 2/1996 | Jain et al. | 709/241 |
| 5,633,861 A | * | 5/1997 | Hanson et al. | 370/232 |
| 5,675,573 A | * | 10/1997 | Karol et al. | 370/230 |
| 5,768,258 A | * | 6/1998 | Van As et al. | 370/236 |
| 5,914,936 A | * | 6/1999 | Hatono et al. | 370/230 |
| 5,959,973 A | * | 9/1999 | Meurisse et al. | 370/232 |
| 5,999,518 A | | 12/1999 | Nattkemper et al. | 370/258 |
| 5,999,525 A | | 12/1999 | Krishnaswamy et al. | 370/352 |

(Continued)

*Primary Examiner*—Firmin Backer
*Assistant Examiner*—Nguyen Ngo
(74) *Attorney, Agent, or Firm*—BainwoodHuang (57) ABSTRACT

Techniques are provided for controlling a flow of packets in a data communications device. A first technique involves transferring packets of a particular packet flow based on an initial policy scheme, and planning a scheme change to change the initial policy scheme to a new policy scheme based on conditions within the data communications device existing while transferring the packets of the particular flow based on the initial policy scheme. The first technique further involves providing a change signal to the source of a particular packet flow (e.g., a sending host). The change signal indicates that the data communications device has planned the scheme change. Additionally, the first technique involves processing the scheme change based on either a reply signal from the source or an absence of a reply signal from the source.

Another technique involves outputting packets of a particular packet flow to a data communications device that transfers the packets of the particular packet flow based on an initial policy scheme. Additionally, the technique involves receiving, in response to the outputted packets of the particular packet flow, a change signal from the data communications device. The change signal indicates that the data communications device has planned a scheme change to change the initial policy scheme to a new policy scheme. Furthermore, the technique involves providing, to the data communications device, a reply signal that provides direction for processing the scheme change.

32 Claims, 6 Drawing Sheets

U.S. PATENT DOCUMENTS

| | | | |
|---|---|---|---|
| 6,055,571 A | 4/2000 | Fulp et al. | 709/224 |
| 6,122,251 A * | 9/2000 | Shinohara | 370/231 |
| 6,157,955 A | 12/2000 | Narad et al. | 709/228 |
| 6,167,445 A | 12/2000 | Gai et al. | 709/223 |
| 6,208,619 B1 * | 3/2001 | Takeuchi | 370/229 |
| 6,246,754 B1 * | 6/2001 | Cole et al. | 379/93.29 |
| 6,381,216 B1 * | 4/2002 | Prasad | 370/236.1 |
| 6,388,994 B1 * | 5/2002 | Murase | 370/235 |
| 6,424,620 B1 | 7/2002 | Nishihara | 370/229 |
| 6,449,255 B1 * | 9/2002 | Waclawsky | 370/236 |
| 6,453,430 B1 | 9/2002 | Singh et al. | 714/47 |
| 6,539,026 B1 | 3/2003 | Waclawsky | 370/428 |
| 6,539,340 B1 | 3/2003 | Robins et al. | 702/186 |
| 6,594,709 B1 | 7/2003 | Agasaveeran et al. | 709/321 |
| 6,625,152 B1 | 9/2003 | Monsen et al. | 370/392 |
| 6,628,610 B1 * | 9/2003 | Waclawsky et al. | 370/229 |
| 6,771,661 B1 | 8/2004 | Chawla et al. | 370/468 |
| 6,775,280 B1 | 8/2004 | Ma et al. | 370/392 |
| 6,792,474 B1 | 9/2004 | Hopprich et al. | 709/245 |
| 6,822,940 B1 * | 11/2004 | Zavalkovsky et al. | 370/237 |
| 6,987,730 B2 * | 1/2006 | Hata et al. | 370/232 |

* cited by examiner

| QUERY 100 | REPLY 110 (OPTIONAL) | PACKET SOURCE 102 | PACKET DESTINATION 104 |
|---|---|---|---|
| SOURCE IP ADDRESS 106 ||||
| DESTINATION IP ADDRESS 108 ||||
| DATA 112 (OPTIONAL) ||||

FIG. 4

| QUERY 130 (OPTIONAL) | REPLY 120 | PACKET SOURCE 122 | PACKET DESTINATION 124 |
|---|---|---|---|
| SOURCE IP ADDRESS 126 ||||
| DESTINATION IP ADDRESS 128 ||||
| DATA 132 (OPTIONAL) ||||

METHODS AND APPARATUS FOR MANAGING A FLOW OF PACKETS USING CHANGE AND REPLY SIGNALS

This patent application is a continuation of U.S. patent application Ser. No. 09/340,524, filed Jun. 28, 1999, now U.S. Pat. No. 6,628,610, entitled "METHODS AND APPARATUS FOR MANAGING A FLOW OF PACKETS USING CHANGE AND REPLY SIGNALS". The entire contents and teachings of this referenced application are hereby incorporated by reference herein. A typical data communications network includes multiple host computers (or hosts) that communicate with each other through a system of data communications devices (e.g., switches and routers) and transmission media (e.g., fiber-optic cable, electrical cable, and/or wireless connections). In general, a sending host exchanges data with a receiving host by packaging the data using a standard protocol or format to form one or more network packets or cells (hereinafter generally referred to as packets), and transferring the packaged data to the receiving host through a system of data communications devices and transmission media. The receiving host then unpackages and uses the data.

BACKGROUND OF THE INVENTION

Generally, data communications devices transfer packets between sending and receiving hosts in accordance with packet management policies. A typical data communications device uses a classification policy, a scheduling policy, and a drop policy. In general, the classification policy directs the data communications device to classify packets based on one or more packet attributes such as size or priority (e.g., type of service bits contained within a type of service field of each packet). The scheduling policy generally directs the data communications device to schedule packets based on packet classification. The drop policy typically directs the data communications device to drop packets under certain network conditions based on packet classification.

In one network arrangement, the data communications devices provide different types of network services by transferring packets at different rates based on the types of data contained in those packets. This network provides high bandwidth for video service (e.g., packet flows containing streams of video images). Without such high bandwidth, end-users at receiving hosts would experience annoying video image hesitation due to packet delays within the network, and perhaps miss video image segments due to packet drops within the network. On the other hand, the network also provides relatively low bandwidth for general data service such as electronic mail (e-mail) since end-users typically cannot detect delays in e-mail delivery caused by packet delays, or by packet drops followed by re-transmissions.

An example of a network that offers different types of services at different rates is a network that supports different Quality of Service (QoS) classes. Generally, in such a network, the header of each packet includes a Quality of Service (QoS) field that enables the network nodes (host computers and data communications devices) to classify that packet as belonging to one of the QoS classes (i.e., as containing one of a variety of data types). For example, packets of a video QoS class (i.e., packets carrying video data to provide video service) travel through the network at a high bandwidth, packets of an audio QoS class travel through the network at a relatively slower bandwidth, and packets of a general data QoS class travel through the network at an even slower bandwidth.

To transfer packets having different types of data (e.g., packets of different QoS classes) at different rates in a network, the data communications devices typically allocate different amounts of network resources (e.g., processing time and buffer space) to different packet types. To accomplish this, the specialized packet management policies (e.g., QoS classification, scheduling and drop policies) within the data communications device control the manner in which the data communications device processes the packets. For example, in the above-described network that supports different QoS classes, each data communications device in the network may classify packets into a video QoS class, an audio QoS class, and a general data QoS class according to a QoS classification policy. Additionally, each device may schedule the packets according to a QoS scheduling policy into either a video queue having a high transmission rate, an audio queue having a relatively slower transmission rate, or a general data queue having an even slower transmission rate. Furthermore, under certain conditions (e.g., significantly high network traffic), some devices may drop packets of a particular QoS class (e.g., the general data QoS class) to reduce congestion and reduce resource contention for the non-dropped packets according to a QoS drop policy. Accordingly, the QoS field of each packet can be viewed essentially as a priority field that controls the transfer rate of that packet.

Although packet management policies are somewhat effective in enabling data communications devices to transfer higher priority packets (e.g., video QoS class packets) faster than lower priority packets (e.g., general data QoS packets), network situations may arise that still prevent high priority packets from arriving at receiving hosts within acceptable time limits. For example, suppose that an end-user at a receiving host wishes to receive a particular video service from a sending host. The end-user sends a request for the video service from the receiving host to the sending host. The sending host responds by providing a flow of video packets to the receiving host along a particular path of the network. Suppose that, at some time during transmission of the video service, a network area along the network path becomes congested with lower priority packets (e.g., general data QoS packets). The amount of congestion may be so great, that one or more data communications devices along the path may delay routing of some video packets, or perhaps even drop (i.e., discard) some video packets. Accordingly, the end-user at the receiving host may encounter hesitation in the video service due to the delays, and may even miss portions of the video service due to dropped video packets.

Mechanisms may be employed in an attempt to reduce packet delays and drops, and to provide more reliable service (e.g., more consistent packet flows). One mechanism involves employing a sending policy at the sending host. The sending policy directs the sending host to a lower transmission rate for packets of a particular service in response to a timeout condition. That is, the sending host initially provides the service (e.g., a video service) to a receiving host at a transmission rate that is suitable for that service. Then, if the sending host fails to receive receipt confirmations from the receiving host for a particular number of packets of that service (e.g., fails to receive acknowledgement messages), the sending host provides remaining portions of the service at a reduced transmission rate. Accordingly, if data from the sending host is a major source of congestion along the path leading to the receiving host, the reduced rate may enable the congestion to clear. If the remaining service is significant in length, the sending host may later increase the transmission rate back to the initial rate after waiting for a set amount of time.

Another mechanism that attempts to provide more reliable service involves the use of Resource reSerVation Protocol (RSVP). In general, RSVP enables users to reserve bandwidth, if available, for particular flows of packets. For example, an end-user at a receiving host may request, from a sending host, a particular video service that uses RSVP. In response to the request, the sending host attempts to reserve bandwidth (e.g., a percentage of bandwidth or buffer resources) in each of the data communication devices along the path that will carry the video packet flow to the receiving host. The sending host then begins the video packet flow. If each data communications device has enough bandwidth available to satisfy the bandwidth requirements of the sending host, the sending host continues with the transmission until the video service is complete. If there is not enough bandwidth available (e.g., a particular data communications device along the path cannot meet the bandwidth requirement), the sending host cancels the transmission and informs the end-user that it cannot satisfy the request.

SUMMARY OF THE INVENTION

In conventional network arrangements, a sending host reduces a transmission rate of a packet flow destined for a receiving host in response to a timeout condition caused by the sending host's failure to receive, from the receiving host, a particular number of acknowledgement messages for the packet flow. Such an operation is intended to reduce packet congestion along the path leading from the sending host to the receiving host thus enabling the sending host to improve delivery of the packet flow to the receiving host. For example, a sending host may provide a stream of video QoS class packets to the receiving host for viewing by an end-user at the receiving host. If significant network congestion occurs in a network area carrying the video packet stream, the receiving host will fail to acknowledge receipt of the video packets within a particular amount of time. When the sending host fails to receive a particular number of acknowledgements from the receiving host within that time (i.e., a timeout period), the sending host considers a timeout condition to have occurred. At that time, the sending host reduces the transmission rate of the video stream (the packet flow) in order to provide an opportunity for the congestion to clear along the path leading to the receiving host.

Unfortunately, by the time the sending host reacts (e.g., changes the transmission rate), an end-user at the receiving host may have endured significant problems caused by packet delays and perhaps packet drops (e.g., video image hesitation and lost video image segments). Such annoyances may result in the loss of goodwill or even loss of repeat business from the end-users (e.g., subscribers).

Furthermore, there is no guarantee that the packet delays and drops of the video stream were due to congestion caused by the sending host. Rather, the congestion may have been caused by a different source such as by extended bursts of low priority packets (e.g., general data packets) from other sending hosts. The increased traffic from the other sending hosts may tie up resources along the path carrying the video stream. Accordingly, transmitting the remaining video stream at a slower rate may only serve to further annoy the end-user at the receiving host since video packets of the video service may arrive at an even slower rate due to the lowered transmission rate.

In contrast to conventional mechanisms that attempt to improve delivery of a flow of packets to a receiving host by lowering the transmission rate of the packet flow in response to timeout conditions caused by the lack of acknowledgement messages from the receiving host, the invention is directed to techniques for controlling a flow of packets using signals between data communications devices in the network and the sending host. The signals permit the sending host and/or the data communications devices to adjust their operations to changing network conditions earlier than conventional mechanisms that rely on timeout conditions triggered by the absence of acknowledgement messages from the receiving host.

One embodiment of the invention is directed to a technique for managing a flow of packets in a data communications device. The technique involves transferring packets of a particular packet flow based on an initial policy scheme, and planning a scheme change to change the initial policy scheme to a new policy scheme. Such planning is based on transfer conditions within the data communications device existing while transferring the packets of the particular flow based on the initial policy scheme. The technique further involves providing a change signal to a source of the particular packet flow (e.g., a sending host). The change signal indicates that the data communications device has planned the scheme change. Additionally, the technique involves processing the scheme change based on either a reply signal from the source or an absence of a reply signal from the source.

In one arrangement, the initial policy scheme is an initial packet dropping scheme for dropping packets from the particular packet flow. In this arrangement, the new policy scheme is a new packet dropping scheme for dropping packets from the particular packet flow in a manner that is different than that of the initial packet dropping scheme. Preferably, the initial packet dropping scheme is not to drop any packets, and the new packet dropping scheme is to drop packets in accordance with a Random Early Detection (RED) policy (e.g., a Weighted Random Early Detection policy or a distributed version of a Random Early Detection policy).

In another arrangement, the initial policy scheme is an initial packet scheduling scheme for scheduling packets of the particular packet flow for transmission. In this arrangement, the new policy scheme is a new packet scheduling scheme for scheduling packets of the particular packet flow for transmission in a manner that is different than that of the initial packet scheduling scheme. Preferably, the initial packet scheduling scheme is a Weighted Fair Queuing (WFQ) policy scheme, and the new policy is a variation of the WFQ policy scheme.

In yet another arrangement, the initial policy scheme is an initial packet classification scheme for classifying packets of the particular packet flow. In this arrangement, the new policy scheme is a new packet classification scheme for classifying packets of the particular packet flow in a manner that is different than that of the initial packet classification scheme. Preferably, the initial packet classification scheme is a precedence-based (e.g., Quality of Service (QoS) based) policy scheme, and the new packet classification scheme is a variation of the precedence-based policy scheme.

If the data communications device receives a reply signal from the source, the reply signal may direct the data communications device to (i) cancel the scheme change or (ii) perform the scheme change. If the reply signal directs the device to cancel the scheme change, the source preferably changes the manner in which it transmits the packet flow. For example, the source may raise a priority of the packets in the packet flow such that the data communications device dedicates more resources to the packet flow. As another example, the source may change the size of the packets in the packet flow to make it easier for the data communications device to handle the packets. Preferably, when the reply signal directs the data communications device to cancel the scheme change for the particular packet flow, the device analyzes other packet streams and attempts to plan a scheme change for a packet flow that is different than the particular packet flow.

If the reply signal indicates that the source accepts the scheme change, the data communications device changes the initial policy scheme to the new policy scheme. Accordingly, the data communications device subsequently transfers packets of the particular packet flow based on the new policy scheme rather than the initial policy scheme.

If the data communications device does not receive a reply signal from the source within a timeout period, the data communications device considers a timeout condition to have occurred. In response to the timeout condition, the data communications device changes the initial policy scheme to the new policy scheme such that the packets of the particular packet flow subsequently are transferred based on the new policy scheme rather than the initial policy scheme.

It should be understood that the change signal from the data communications device to the source, and the reply signal from the source to the data communications device enable the source and data communications device to quickly adjust their operations to changing network conditions before the conditions significantly hinder rendering of the service at the receiving host. Accordingly, the invention provides an improvement in response time over conventional mechanisms that wait until a timeout condition occurs.

Another embodiment of the invention is directed to a computer program product that includes a computer readable medium having instructions stored thereon for managing a flow of packets in a data communications device. The instructions, when processed by the data communications device, cause the data communications device to operate as described above. The computer program product can be bundled with the operating system for the data communications device. Alternatively, the computer program product can be distributed separately.

Another embodiment of the invention is directed to a technique for providing a flow of packets from a data source (e.g., a sending host) to a data communications device. The technique involves outputting packets of a particular packet flow to a data communications device that transfers the packets of the particular packet flow based on an initial policy scheme. Additionally, the technique involves receiving, in response to the outputted packets of the particular packet flow, a change signal from the data communications device. The change signal indicates that the data communications device has planned a scheme change to change the initial policy scheme to a new policy scheme. Furthermore, the technique involves providing, to the data communications device, a reply signal that provides direction for processing the scheme change.

The reply signal may direct the data communications device to cancel the scheme change, or to perform the scheme change. If the reply signal directs the data communications device to cancel the scheme change, the source preferably changes the manner in which it outputs packets of the particular packet flow. In one arrangement, after the source receives the change signal, the source outputs packets of the particular packet flow to the data communications device such that each of the packets has a new packet processing priority that is different than an initial packet processing priority. In another arrangement, after the source receives the change signal, the source outputs packets of the particular packet flow to the data communications device such that each of the packets has a new packet size that is different than an initial packet size. In another arrangement, after the source receives the change signal, the source outputs packets of the particular packet flow to the data communications device at a different transmission rate.

Another embodiment of the invention is directed to a computer program product that includes a computer readable medium having instructions stored thereon for providing a flow of packets from a source to a data communications device. The instructions, when processed by the data communications device, cause the source to operate as described above.

The computer program product can be packaged with the operating system for the source (e.g., the sending host's operating system). Alternatively, the computer program product can be distributed separately.

Another embodiment of the invention is directed to a packet drop circuit for dropping packets stored within a data communications device. The packet drop circuit includes a monitor circuit that monitors the data communication device for a particular transfer condition while the data communications device transfers packets of a particular flow based on an initial policy scheme. Additionally, the packet drop circuit includes a change circuit, coupled to the monitor circuit, that plans a scheme change to change the initial policy scheme to a new policy scheme in response to a detection of the particular transfer condition by the monitor circuit. Furthermore, the packet drop circuit includes a notification circuit, coupled to the change circuit, that provides notification of the planned scheme change.

The features of the invention, as described above, may be employed in data communications devices and other computerized devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Overview

The invention is directed to techniques for controlling a flow of packets from a sending host to a receiving host using communication between the sending host and a data communications device along a network path carrying the packet flow. In accordance with a set of policies, the data communications device transfers packets including those of the packet flow from the sending host. In response to changing network conditions or other factors (e.g., a system administrator command), the data communications device may decide to change a policy scheme that would affect the transfer of the packet flow from the sending host. That is, the data communications device may determine that present network conditions warrant a change in policy, or a change in the manner in which it uses a policy. For example, the data communications device may plan to drop packets of a particular data flow. In such a situation, the data communications device sends a change (or query) signal to the sending host indicating that the data communications device has planned a scheme change (e.g., is about to begin dropping packets). The sending host can then respond to the change signal by providing, to the data communications device, a reply signal accepting or canceling the planned scheme change. The data communications device then processes the planned scheme change (e.g., by performing or canceling the change) based on the reply signal, or the absence of a reply signal within a timeout period. If the sending host cancels the scheme change, the sending host may modify its behavior so that the planned scheme change is no longer needed.

In general, the techniques of the invention improve the abilities of the sending host and/or the data communications devices to adjust their operations to changing network conditions. In particular, the techniques of the invention enable the sending host to respond more quickly to changing network conditions than conventional mechanisms that rely on sending hosts to detect timeout conditions triggered by the absence of acknowledgement messages from receiving hosts during timeout periods. Accordingly, at the receiving hosts, end-users for certain services, such as video services which typically require high bandwidth, may be able to avoid annoying situations caused by delayed and dropped packets. Such techniques may be employed in data communications devices and other computerized devices such as those manufactured by Cisco Systems, Inc. of San Jose, Calif.

Figure 1:
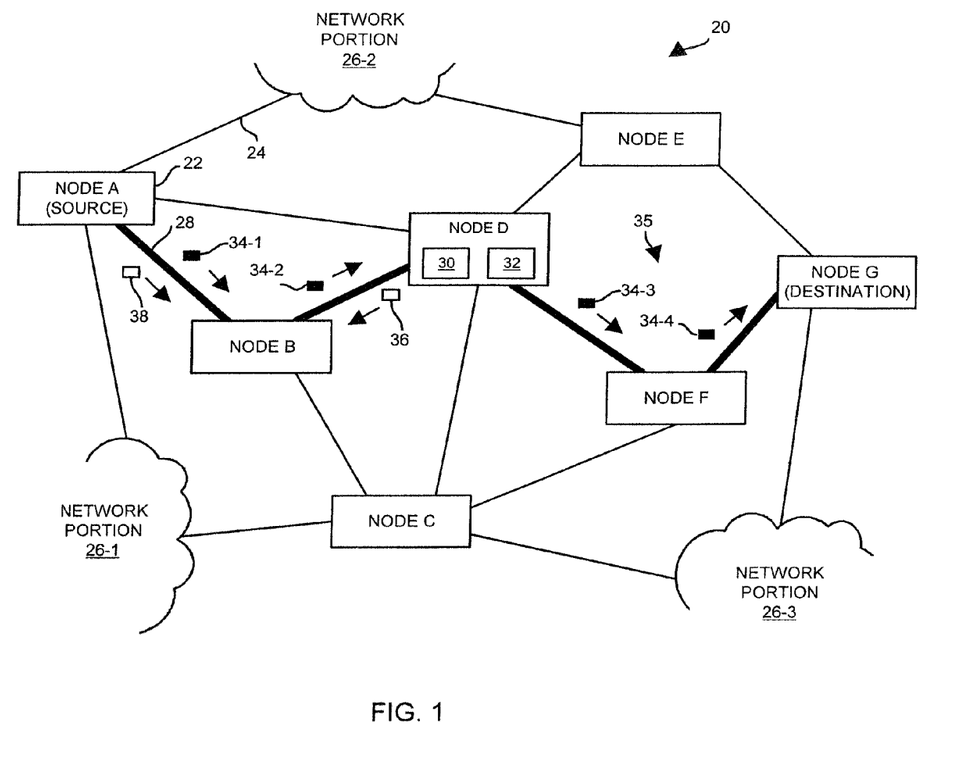
FIG. 1 is a block diagram of a data communications network that includes a data communications device and a data source configured according to the invention.

FIG. 1 shows a network 20 that is suitable for use by the invention. The network 20 includes multiple computerized nodes 22 (e.g., host computers and data communications devices), and transmission media 24 (e.g., fiber-optic and electrical cable, wireless connections, etc.) which carry data between the nodes 22. The particular configuration of the network 20 is provided by way of example only, and other configurations and/or topologies are suitable for use by the invention. Additionally, the network 20 may extend beyond that which is shown in FIG. 1, such as to other network portions 26 (e.g., portions 26-1, 26-2, 26-3) having other nodes and transmission media (not shown).

Preferably, each node 22 is a computerized device having a processor 30 and memory 32 (see NODE D). The memory 32 of each node 22 stores instructions which, when processed by the processor 30 of that node 22, control the operation of that node 22.

The nodes 22 communicate with each other by exchanging data over the transmission media 24 and perhaps through other nodes 22. By way of example, NODE A provides a service in the form pakets 34-1, 34-2, 34-3, 34-4, ... (collectively, packets 34 that form a flow of packets 35) to NODE G along a path formed by NODE A, NODE B, NODE D, NODE F, and NODE G (highlighted in FIG. 1). Accordingly, NODE A is considered the source of the service, and NODE G is considered the destination of the service.

NODE D transfers packets through the network 20 including those of the packet flow 35 based on a set of policies. In accordance with the invention, NODE D may plan a policy scheme change, i.e., a plan to change the manner in which it uses a policy, or a plan to replace one policy with another. If the NODE D determines that the planned scheme change will affect the transfer of the packet flow 35, NODE D sends a change signal 36 to NODE A, the source of the packet flow 35, indicating that NODE D has planned the scheme change. In response, NODE A provides a reply signal 38 to NODE D either accepting or canceling the planned scheme change.

Based on the reply signal 38, NODE D performs the planned scheme change or cancels the planned scheme change (e.g., NODE D begins to drop packets of the packet flow 35 or cancels its plan to drop packets of the packet flow 35). In either case, NODE A has been notified of the planned scheme change and can modify the manner in which it provides the remaining packets 34 of the packet flow 35.

Figure 2:
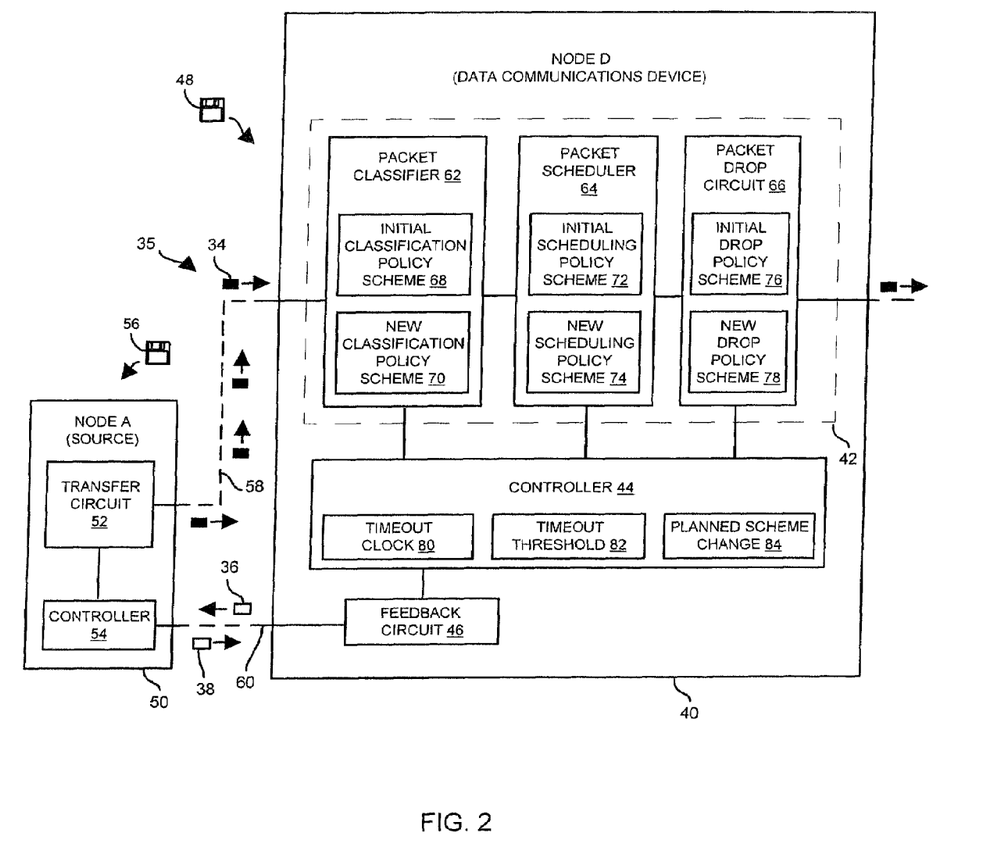
FIG. 2 is a more detailed block diagram of the data communications device and the data source of FIG. 1.

Further details of the invention will now be provided with reference to FIG. 2 which shows NODE A and NODE D in more detail. NODE D is a data communications device 40 having a transfer circuit 42, a controller 44, and a feedback circuit 46. The transfer circuit 42 transfers packets from input ports to output ports based on a set of policies. The controller 44 monitors network conditions for opportunities to improve its operation by changing the manner in which the transfer circuit 42 uses the policies, and communicates with other nodes 22 of the network 20 through the feedback circuit 46. The feedback circuit 46, under direction of the controller 44, exchanges signals with the other nodes 22 of the network 20 (e.g., sends a change signal 36 to NODE A).

It should be understood that the circuits 42, 44 and 46 of the data communications device 40 preferably operate based on instructions received from a computer program product 48. In one arrangement, the computer program product 48 includes an operating system for the data communications device 40, and the instructions form part of the operating system. For example, the operating system can be the Cisco IOS manufactured by Cisco Systems, Inc. of San Jose, Calif. In another arrangement, instructions are shipped separately from the operating system (e.g., in the computer program product 48, or from a network download from a server, etc.).

With reference still directed to FIG. 2, NODE A is a sending host that is configured as a source 50 of the packet flow 35. The source 50 includes a transfer circuit 52 and a controller 54. The transfer circuit 52 provides the packet flow 35 to a receiving host (e.g., NODE G) through the data communications device 40. The controller 54 (i) controls the manner in which the transfer circuit 52 operates (e.g., setting the priority, packet sizes, and/or the transmission rate for the packet flow 35), and (ii) communicates with other nodes 22 of the network 20 (e.g., sends a reply signal 38 to NODE D).

It should be understood that the circuits 52, 54 of the source 50 preferably operate based on instructions received from a computer program product 56. In one arrangement, the computer program product 56 includes an operating system for the source 50, and the instructions form part of the operating system. In another arrangement, instructions are shipped separately from the operating system (e.g., in the computer program product 56, or from a network download from a server, etc.). An example of the source 50 (NODE A) is a general purpose computer running Windows/NT manufactured by Microsoft, Corporation of Redmond, Wash.

It should be understood further that it is not necessary that the change and reply signals 36, 38 flow along the same path in the network 20 as the packet flow 35. In one arrangement, as shown in FIG. 1, the change and reply signals 36, 38 and the packet flow 35 travels along the same path (e.g., through NODE B). Alternatively, as shown in FIG. 2, the change and reply signals 36, 38 can travel along one path (the dashed line 60), and the packet flow 35 can flow along a different path (the dashed line 58).

As shown in FIG. 2, when the packet flow 35 arrives at an input port of the data communications device 40, the transfer circuit 42 routes each packet 34 of the packet flow 35 to an output port that leads to NODE G through NODE F (also see FIG. 1). The transfer circuit 42 includes a packet classifier 62, a packet scheduler 64 and a packet drop circuit 66. The packet classifier 62 classifies packets according to an initial classification policy scheme 68, and has the capability to change policy schemes, under direction of the controller 44, such that it classifies packets according to a new classification policy scheme 70. Similarly, the packet scheduler 64 schedules packets according to an initial scheduling policy scheme 72, and has the capability to change policy schemes, under direction of the controller 44, such that it schedules packets according to a new scheduling policy scheme 74. Furthermore, the packet drop circuit 66 drops packets according to an initial drop policy scheme 76, and has the capability to change policy schemes, under direction of the controller 44, such that it drops packets according to a new drop policy scheme 78.

The controller 44 includes a timeout clock 80, a timeout threshold 82, and memory (e.g., a queue) for storing a planned scheme change 84 in response to changing network conditions. The controller 44 uses the timeout clock 80 and the timeout threshold 82 as a timeout mechanism for receiving the reply signal 38 from the source 50. In particular, after the data communications device 40 sends the change signal 36 to the source 50, the data communications device 40 starts the timeout clock 80. If the data communications device 40 receives the reply signal 38 from the source 50 before the timeout clock 80 passes the timeout threshold 82, the data communications device processes the planned policy scheme change in accordance with the reply signal 38. However, if the data communications device 40 does not receive a reply signal 38 from the source 50 before the timeout clock 80 counts past the timeout threshold 82, the data communications device 40 considers a timeout condition to have occurred and performs the planned policy scheme change.

Signal Formats

Figure 3:
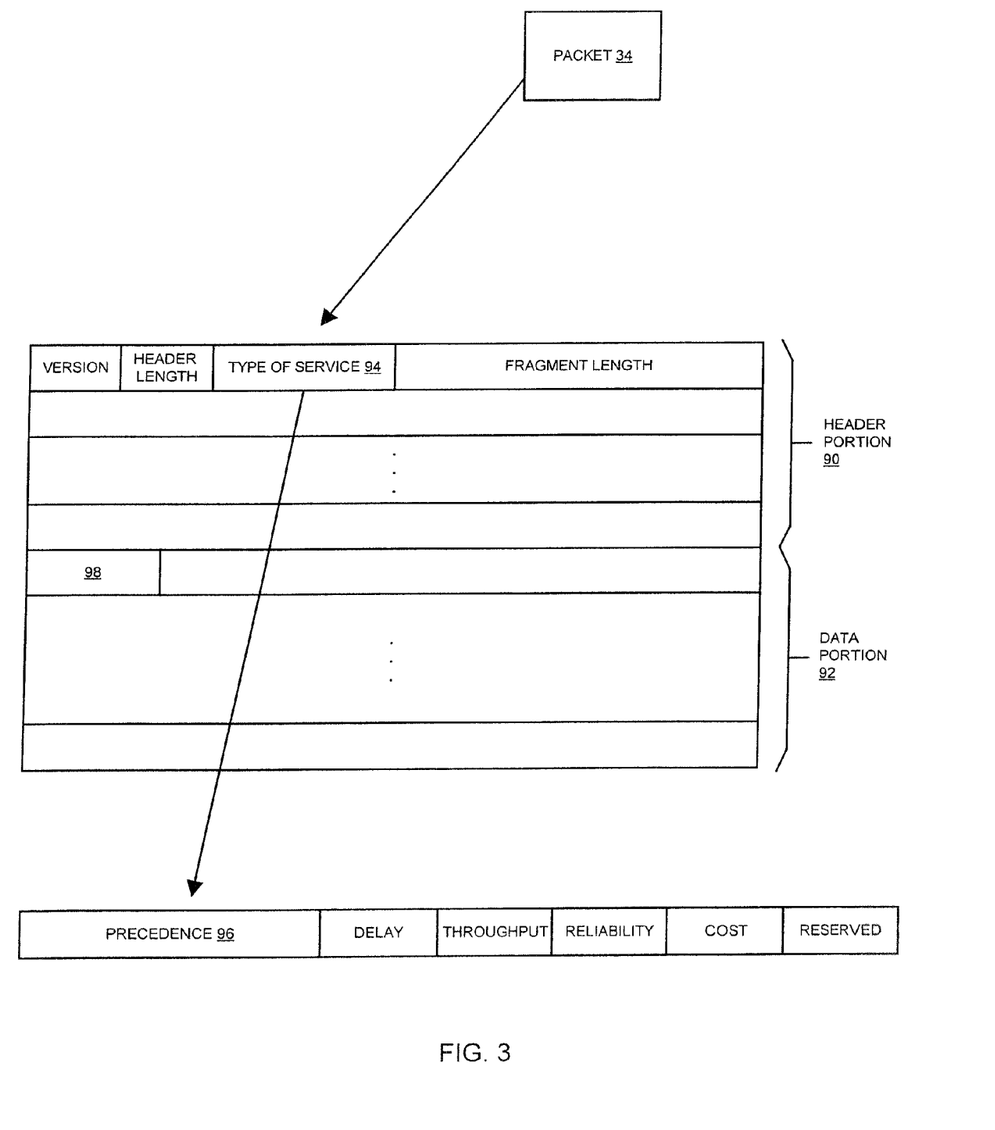
FIG. 3 is a block diagram of a data packet that is suitable for use by the data communications device and the data source of FIG. 1.

Further details of the various packets and signals exchanged between the source 50 and the data communications device 40 will now be explained with reference to FIGS. 3-5. FIG. 3 shows a packet 34 of the packet flow 35 that is suitable for use by the invention. Preferably, the packet 34 includes a header portion 90 and a data portion 92. The header portion 90 includes routing information that enables nodes 22 of the network 20 to determine particular attributes of the packet 34 such as its source, destination, and size. The data portion 92 includes data for use by the destination node (e.g., see NODE G in FIG. 1).

Preferably, the header portion 90 includes a type of service field 94 that directs the manner in which a data communications device operates on the packet 34. In particular, the type of service field 94 identifies a class or precedence for the packet 34. A node 22 such as NODE D classifies the packet 34 based on the contents of the type of service field 94. As illustrated in FIG. 3, the type of service field 94 may include additional information other than just a priority (e.g., precedence 96). For example, the type of service field 94 may further include delay, throughput, reliability, and/or cost information.

The format of the packet 34 shown in FIG. 3 is similar to that of an Internet Protocol (IP) datagram, and IP datagrams are suitable for use as the packets 34. In one arrangement, the precedence bits provide for multiple grades of service (e.g., nine) which can correspond to separate drop thresholds that are spaced evenly through a potential mean queue depth.

It should be understood that it is not necessary that the header portion of the packet 34 include classification or routing information. Rather, the data portion 92 can include a dedicated field 98 for storing the classification or routing information used by data communications devices of the network 20.

Figure 4:
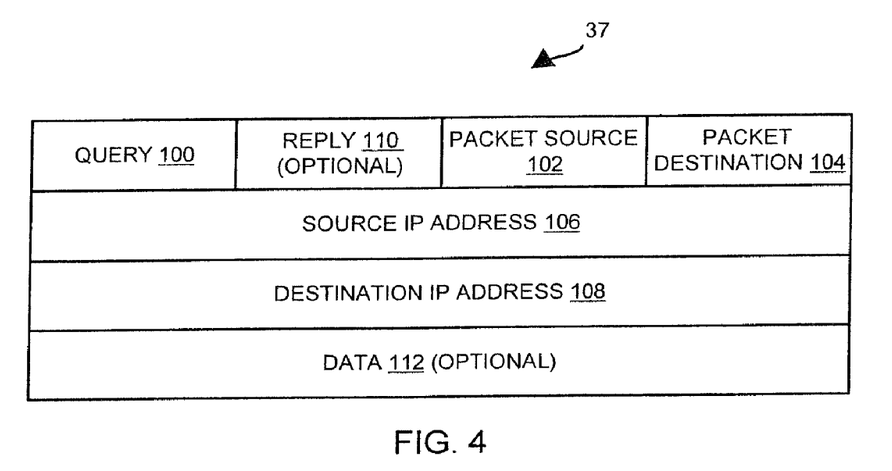
FIG. 4 is a block diagram of a change signal packet that is suitable for use by the data communications device and the data source of FIG. 1.

FIG. 4 shows a block diagram of a change signal 36 in a packetized form 37 that is suitable for use by the invention. The change signal packet 37 includes a query field 100 indicating that the packet 37 is a special packet intended to indicate that a data communications device within the network 20 has planned a scheme change. The change signal packet 37 further includes a packet source field 102 indicating the source of the packet 37, a packet destination field 104 indicating the destination of the packet 37, a source address 106 further identifying the source by a standard address (e.g., an IP address), and a destination address 108 further identifying the destination by a standard address.

The change signal packet 37 may further include a reply field 110 and a data field 112. When a source (e.g., NODE A in FIG. 2) prepares a reply signal 38, the source may conveniently copy the change signal packet 37, insert a reply command in the reply field 110 (e.g., accepting or canceling the planned scheme change), update the source and destination fields 102, 104, and then send the copy of the packet 37 to the data communications device that originated the change signal packet 37 (e.g., NODE D in FIG. 2). This simple return procedure enables the data communications device to identify the change signal packet 37 as being directed to itself rather than another data communications device. The data communications device then reads the reply field 110 and perhaps data from the data field 112 (e.g., parameters for the reply or further instructions), and then performs or cancels the scheme change based on the reply field 110 and, if available, any data in the data field 112.

Figure 5:
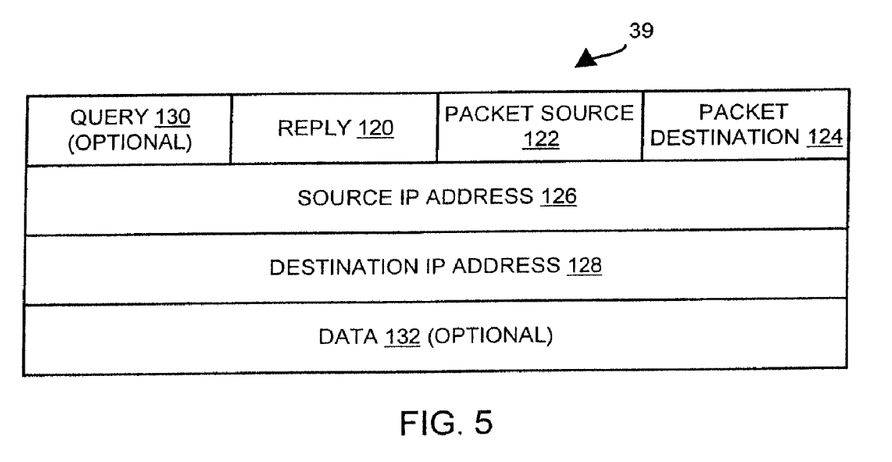
FIG. 5 is a block diagram of a reply signal packet that is suitable for use by the data communications device and the data source of FIG. 1.

FIG. 5 shows an alternative packetized arrangement 39 for the reply signal 38. In this arrangement, the reply signal packet 39 includes a reply field 120 containing a reply command (e.g., accepting or canceling the scheme change), a packet source field 122 indicating the source of the packet 39, a packet destination field 124 indicating the destination of the packet 39, a source address 126 further identifying the source by a standard address, and a destination address 128 further identifying the destination by a standard address.

The reply signal packet 39 preferably further includes a query field 130 and a data field 122 making it similar to the change signal packet 37. The query field 130 is preferably a copy of the query field 100 in the change signal packet 37. The source provides in the reply signal packet 39 with the query field 130 as confirmation that the reply signal packet 39 is valid. That is, the data communications device receiving and processing the reply signal packet 39 may analyze the contents of the query field 130 using an error checking, decoding, or validation procedure for safety. The data communications device may read the reply field 120 and perhaps data from the data field 132 (e.g., parameters for the reply or further instructions), and then perform or cancel the scheme change based on the reply field 120 and, if available, any data in the data field 132.

Details of Data Communications Device Operation

Figure 6:
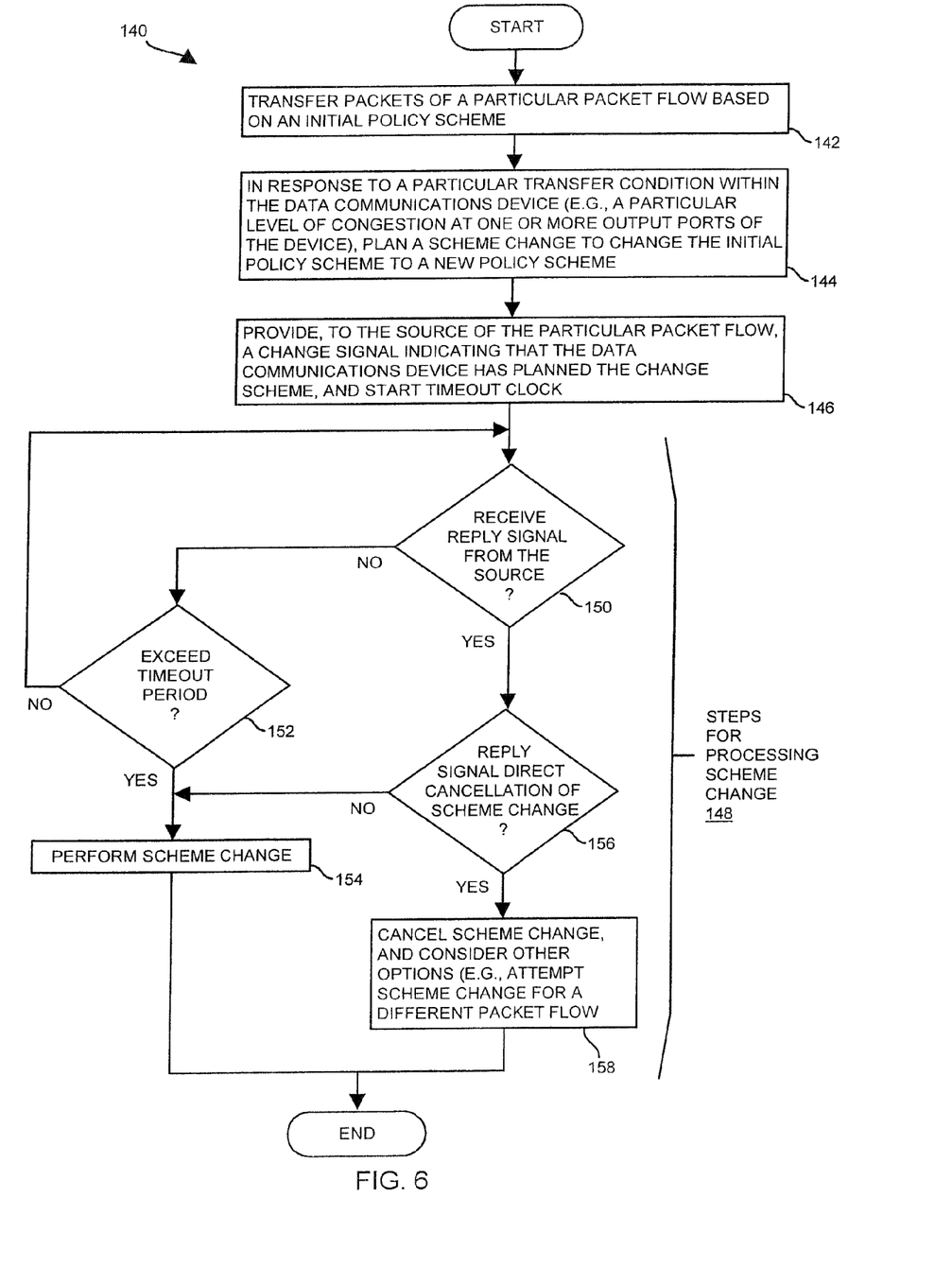
FIG. 6 is a flow chart illustrating the operation of the data communications device of FIG. 1.

Further details of the operation of the data communications device 40 (see FIG. 2) will now be provided with reference to FIG. 6. In accordance with an embodiment of the invention, the data communications device 40 performs a procedure 140 when determining that a policy scheme change is warranted. In step 142, the data communications device 40 begins transferring packets of a particular packet flow based on an initial policy scheme. For example, the data communications device 40 may classify packets based on a QoS classification policy.

In step 144, the data communications device 40 plans a policy scheme change in response to a particular transfer condition within the data communications device 40. For example, the data communications device 40 may determine that it is becoming difficult to transfer a packet flow from a particular source 50 (e.g., see NODE A in FIG. 2) because low priority packets are quickly filling up memory buffers within the data communications device 40. At this time, the data communications device 40 may plan to change its classification policy to one that is priority based from one that is first-in/first-out (FIFO) based. Accordingly, the data communications device 40 schedules a scheme change to occur at a particular time in the near future.

In step 146, the data communications device 40 provides, to the source 50 of the packet flow (e.g., NODE A), a change signal (e.g., the change signal packet 36 in FIGS. 2 and 4) indicating, in a feedback manner, that the data communications device 40 has planned a scheme change that will affect the packet flow 35 provided by the source 50. Additionally, the data communications device 40 starts a timeout clock (e.g., the timeout clock 80 in FIG. 2).

The data communications device 40 then performs a series of steps 148 that process the planned scheme change. In step 150, the data communications device 40 checks whether its has received a reply signal (e.g., the reply signal packet 38 in FIG. 5) from the source 50 of the packet flow 35. If no reply signal has been received, the data communications device 40 proceeds to step 152.

In step 152, the data communications device 40 checks the timeout clock (e.g., timeout clock 80) to see whether the timeout period (e.g., defined by the timeout threshold 82, see FIG. 2) has expired. If the timeout period has not expired, the data communications device 40 returns to step 150. If the timeout period has expired, the data communications device 40 proceeds to step 154.

In step 154, the data communications device 40 performs the scheme change. In particular, the data communications device 40 replaces the initial policy scheme with the new policy scheme. For example, the data communications device 40 replaces a FIFO classification policy with a QoS classification policy to subsequently route packets based on priority rather than time of receipt.

If the data communications device 40 receives a reply signal in step 150, the data communications device 40 proceeds to step 156. In step 156, the data communications device 40 determines whether the reply signal directs the data communications device 40 to cancel the planned scheme change. If not, the data communications device 40 proceeds to step 154, wherein the scheme change is performed.

On the other hand, if the reply signal 38 directs the data communications device 40 to cancel the scheme change, the data communications device 40 proceeds to step 158. In step 158, the data communications device 40 cancels the scheme change. Cancellation of the scheme change enables the packets that have already been received by the data communications device 40 to be routed using the policy scheme presently in place. Accordingly, no connections need to be torn down or re-established as in many conventional RSVP arrangements.

Preferably, in step 158, the data communications device 40 further considers whether another scheme change is warranted. For example, the data communications device 40 may plan a scheme change that affects a different packet flow (e.g., a RED policy can check other flows in increasing sequence and attempt to drop a different priority or precedence flow). If the data communications device 40 plans another scheme change, the data communications device 40 can then repeat procedure 140 for the packet flows affected by that planned change.

Details of Data Source Operation

Figure 7:
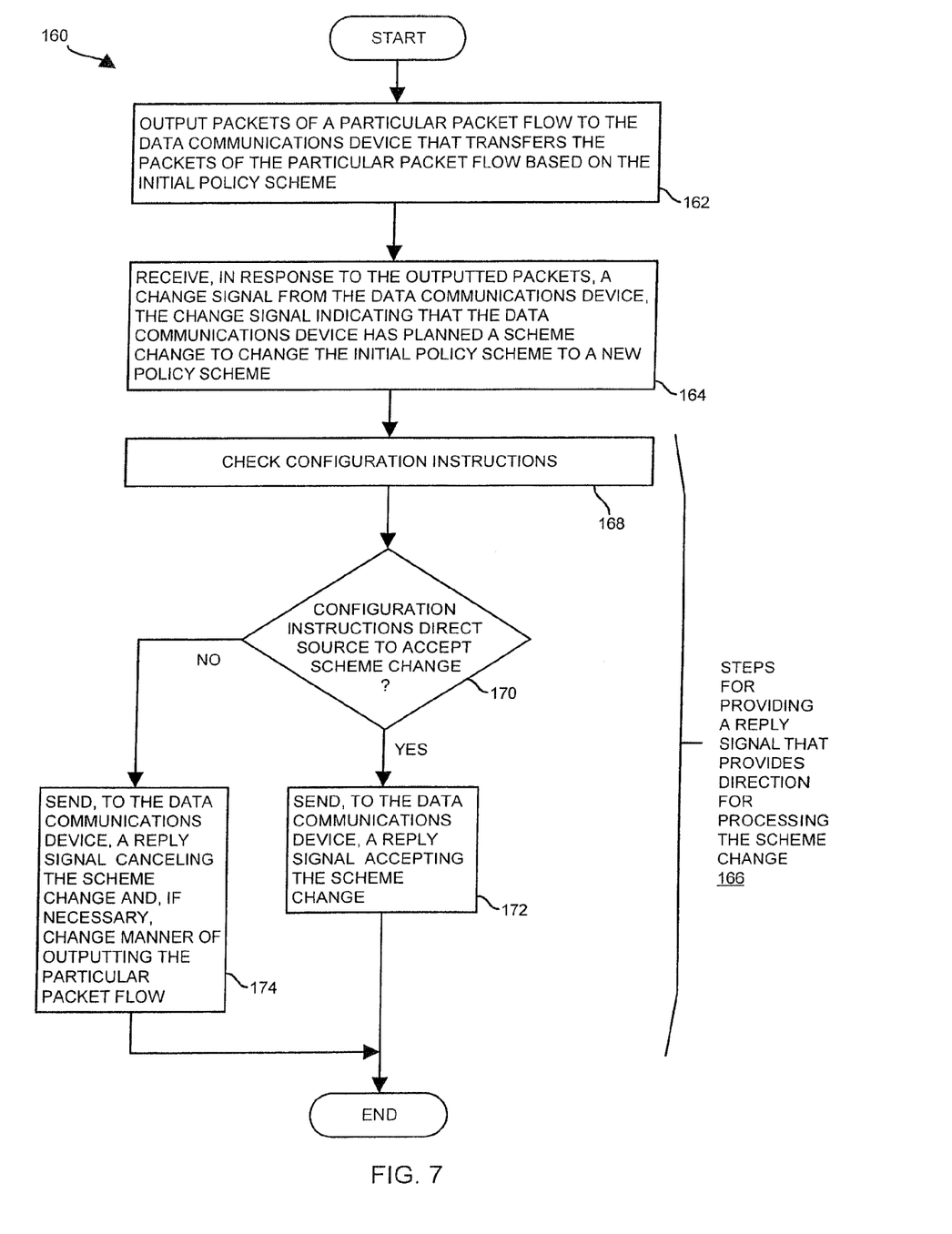
FIG. 7 is a flow chart illustrating the operation of the data source of FIG. 1.

FIG. 7 shows a procedure 160 performed by the source 50 (see FIG. 2) of the packet flow 35 when processing a change signal 36 from the data communications device 40. In step 162, the source 50 outputs packets of the packet flow 35 to the data communications device 40. The data communications device 40 responds by processing packets of the packet flow 35 based on an initial policy scheme.

In step 164, the source 50 receives, in response to the outputted packet flow, a change signal 36 indicating that the data communications device 40 has planned a scheme change to change the initial policy scheme to a new policy scheme.

The source 50 then performs a series of steps 166 which involve providing the data communications device 40 with direction for processing the planned scheme change. In particular, in step 168, the source 50 checks configuration instructions to determine whether it should accept the planned scheme change, or direct the data communications device 40 to cancel the planned scheme change. The source 50 may run one or more algorithms to generate the configuration instructions scientifically, or may check instructions in its memory (e.g., a systems administrator may have provided explicitly instructions on how to reply).

In step 170, the source 50 determines whether the configuration instructions direct the source 50 to accept the scheme change. If so, step 170 proceeds to step 172. If not, step 170 proceeds to step 174.

In step 172, the source 50 sends, to the data communications device 40, a reply signal (e.g., see the reply signal packet 38 in FIG. 5) accepting the scheme change. In response, the data communications device 40 will perform the scheme change by replacing the initial policy scheme with a new policy scheme.

In step 174, when the configuration instructions direct the source 50 to cancel the scheme change, the source 50 sends a reply signal (e.g., the reply signal packet 38) directing the data communications device 40 to cancel the scheme change. Preferably, the source 50 further changes the manner in which it provides the particular packet flow 35. For example, the source 50 may change (e.g., raise) the priority of the packets within the packet flow 35 so that the data communications device 40 dedicates more resources to transferring the packets. As another example, the source 50 may change (e.g., increase) the size of the packets so that the data communications device 40 processes the packet flow in a more optimized manner.

As described above, the procedure 160 enables the data source 50 to participate in the allocation of bandwidth at the data communications device 50 (e.g., end-to-end QoS requirements) by allowing the source to accept or cancel the planned policy scheme change at the data communications device 50. It should be understood that the source 50 can perform the procedure 160 for multiple data communications devices (e.g., all the nodes 22) along its transmission path. Accordingly, a feedback mechanism is essentially provided for each node 22 along the path back to the source 50.

EXAMPLE

The operation of the source 50 (NODE A) and the data communications device 40 (NODE D) will now be further explained using the following example. Suppose that NODE A is a sending host that provides, as a service, a stream of video images (a video service) to an end-user at NODE G, a receiving host (see FIG. 1). The end-user watches the video service as it arrives and is rendered on-the-fly.

Further suppose that the data communications device 40 initially routes packets using a FIFO classification policy (see the initial classification policy scheme 68 in FIG. 2), a Weighted Fair Queuing scheduling policy (see the initial scheduling policy scheme 72), and a Random Early Detection drop policy (see the initial drop policy scheme 76). Such policies initially may be the most suitable policies for network conditions existing around NODE D.

Suppose that the network conditions around NODE D change shortly after NODE A begins providing the video service (i.e., the packet flow 35) to the end-user at NODE G (see step 162 in FIG. 7 and step 142 in FIG. 6). In particular, suppose that packets 34 of the video service initially have a medium priority, and that the bursts of other medium priority packets from other nodes 22 begin to congest NODE D. At that point, the controller 44 of NODE D plans to switch an initial policy scheme to a new policy scheme which, when implemented, will affect the transfer of the video packet flow 35 (see step 144 in FIG. 6). As one example, the controller 44 may plan to switch the FIFO classification policy to a QoS classification policy (see the new classification policy scheme 70 in FIG. 2). As another example, the controller 44 may plan to switch the WFQ scheduling policy to a DWFQ scheduling policy (see the new scheduling policy scheme 74). As yet another example, the controller 44 may plan to switch the RED drop policy to a WRED drop policy (see the new drop policy scheme 78) thus causing certain video packets 34 to be dropped.

In response to the planned change, the data communications device 40 sends a change signal 36 (see FIGS. 1 and 2) to NODE A (see step 146 in FIG. 6). The change signal 36 indicates that NODE D has planned a change in a policy scheme that would affect the transfer of packets 34 of the packet flow 35.

When NODE A receives the change signal 36 (see step 164 in FIG. 7), NODE A determines whether it should accept or cancel the planned policy change in NODE D (see step 166 in FIG. 7). Suppose that NODE A provides the packet flow 35 as part of a video service. In these cases, NODE A may determine that it should not accept the policy scheme change (see steps 168 and 170 in FIG. 7). Accordingly, NODE A then provides the reply signal 38 directing NODE D to cancel the planned change (see step 172 in FIG. 7). If NODE A is configured appropriately, NODE A may further change the manner in which it provides the packet flow 35. For example, NODE A may increase the priority level of the remaining packets 34 in the packet flow 35. Alternatively, NODE A may change the packet size of the remaining packets 34 (e.g., making them larger). The intent of such changes in packet attributes is to make it easier for NODE D to route the packets 34 to NODE G.

On the other hand, suppose that the packet flow 35 is simply a low priority best effort service. In this case, NODE A can choose to accept the planned policy scheme change. Accordingly, in this situation, NODE A sends the reply signal 38 to NODE D directing NODE D to perform the change (see step 172 in FIG. 7). Since NODE A still has knowledge of the change, NODE A has the option of modifying the manner in which it provides the remaining packets 34 of the packet flow 35 (e.g., changing the priority or size of the packets 34).

Suppose that NODE D had planned to drop packets 34 of the packet flow 35. If NODE A accepts the planned policy scheme change, NODE D performs the change and drops packets 34 of the packet flow 35 (step 154 in FIG. 6). However, if NODE A directs NODE D to cancel the planned policy scheme change, NODE D will not drop any packets 34. Rather, NODE D will cancel the planned policy scheme change and continue to transfer packets 34 of the packet flow according to presently used policies (step 158 in FIG. 6). NODE D may attempt to plan a policy scheme change for a packet flow that is different than the packet flow 35. If NODE A changes the manner in which it provides remaining packets 34 of the packet flow 35 (e.g., changes their priority or size), NODE D will process the remaining packets 34 according to the new packet attributes. Accordingly, NODE D does not lose any packets 34 of the packet flow 35, NODE A changes the manner in which it provides the packets 34 to improve the packet flow 35 through the network 20, and the end-user at NODE G does not experience an interruption in video service.

As described above, the invention is directed to techniques for controlling packets using signals between a source of a packet flow and a data communications device. Such techniques can enable more efficient and effective transfer of packets thus avoiding packet delays and perhaps packet drops. As such, services at receiving hosts will be less affected by problematic changing network conditions. Such features allow for better network control, improved network resource utilization, and better maintenance of deterministic network behavior. The features of the invention may be particularly useful in computerized devices manufactured by Cisco Systems, Inc. of San Jose, Calif.

EQUIVALENTS

While this invention has been particularly shown and described with references to preferred embodiments thereof, it will be understood by those skilled in the art that various changes in form and details may be made therein without departing from the spirit and scope of the invention as defined by the appended claims.

For example, there is no requirement that the network 20 use packets. Rather, the network 20 could convey data using other mechanisms such as circuit switched mechanisms, ATM cells, analog multiplexed signals, etc. Regardless of the service conveyance mechanism, the data communication device involved (e.g., a bridge, router, cellular base station, etc.) can operate by (i) planning a change in the manner in which it operates, (ii) sending a change signal to the source of data to identify the planned change, and (iii) processing the planned change based on a reply signal from the source or the absence of a reply signal.

Additionally, it should be understood that the nodes 22 (e.g., NODE D and NODE A) do not need to be computerized devices running programs. Rather, that can be specialized hardware (e.g., circuit board and ASIC devices). Moreover, the transmission media 24 is not necessarily cable-based but can include other media types (e.g., radio, microwave and wireless communications).

Furthermore, the priority or QoS of the packets can reside in the header or data fields of the packets. Also, such information can be provided separately such as in a header packet that is followed by data packets.

Additionally, the change signal 36 and the reply signal 38 do not need to be provided using the same protocol as the packets 34. Rather, these signals be provided using other protocols and mechanisms (e.g., packet-based, cell-based, wireless, analog or radio signals). Also, the information contained in such signals can be messages in digital form (i.e., binary), voltage levels, frequencies, etc.

Furthermore, the source or sending host can modify, in response to the change signal 36, the manner in which it provides a packet flow in ways other than changing the priority or packet size. For example, the source can modify the delays associated with the packets 34 (e.g., a value in a delay field of the packets 34).

It should be understood that the data communications device 40 can decide to plan a policy scheme change in response to factors other than changing network conditions. For example, the data communications device can plan a policy scheme change in response to the time of day, a command signal from a network controller, an error detection, or other types of events.

Additionally, it should be understood that other policies could be used in addition to the policies described above. Some examples of drop policies are tail-drop, Random Early Detection and Weighted Random Early Detection policies. Some examples of scheduling policies are Weighted Fair Queuing and Distributed Weighted Fair Queuing policies. Some classification policies are First-in/First-Out, QoS-based, and packet size-based policies. Essentially, any data transmission policy (e.g., scheduling and congestion avoidance algorithms) can be utilized by incorporating an extension to the policy such that it indicates a warning (e.g., by passing a threshold) to the source at some time prior to changing its operation in order to give the source an opportunity to respond.

Furthermore, the source can respond in ways other than changing packet size and packet priority in response to a change signal. For example, the source can change the rate at which it transmits the packets, the source can stop transmission of the packets temporarily, or the source can send the packets out a different port in an attempt to route the packets along a different path to avoid the congested data communications device.

Additionally, it should be understood that the source can communicate with more the one data communications device in the manner described above. For example, the source may receive change signals from multiple data communications devices that have planned policy scheme changes. The source can respond to the change signals with reply signals simultaneously or one at a time. In either case, the source can participate in the allocation of bandwidth at multiple nodes along its transmission path by using reply signals, and by changing packet flow attributes (e.g., utilizing precedence bits to guarantee a particular Quality of Service).

What is claimed is:

1. In a data communications device, a method for managing a flow of packets, comprising:
   transferring packets of a particular packet flow from input ports to output ports of the data communications device based on an initial policy scheme controlling an initial manner in which the packets are transferred from the input ports to the output ports of the data communications device;
   planning a scheme change to change the initial policy scheme to a new policy scheme based on transfer conditions within the data communications device existing while transferring the packets of the particular flow based on the initial policy scheme, the new policy scheme controlling a new manner in which the packets are transferred from the input ports to the output ports of the data communications device; and
   providing a change signal to a source of the particular packet flow, the change signal indicating that the data communications device has planned the scheme change,
wherein the data communications device is a first computerized node of a network, the source of the particular packet flow is a second computerized node of the network coupled to the first computerized node by a packet transmission medium, and providing the change signal comprises transmitting a change signal packet into the network destined for the second computerized node
and further comprising:
   accepting a reply signal from the source;
   changing the initial policy scheme to the new policy scheme when contents within a reply field of the reply signal represent a first value; and
   maintaining the initial policy scheme when the contents within the reply field of the reply signal represent a second value that is different than the first value.

2. The method of claim 1 wherein the initial policy scheme is an initial packet dropping scheme for dropping packets from the particular packet flow, and wherein the new policy scheme is a new packet dropping scheme for dropping packets from the particular packet flow in a manner that is different than that of the initial packet dropping scheme.

3. The method of claim 1 wherein the initial policy scheme is an initial packet scheduling scheme for scheduling packets of the particular packet flow for transmission, and wherein the new policy scheme is a new packet scheduling scheme for scheduling packets of the particular packet flow for transmission in a manner that is different than that of the initial packet scheduling scheme.

4. The method of claim 1 wherein the initial policy scheme is an initial packet classification scheme for classifying packets of the particular packet flow, and wherein the new policy scheme is a new packet classification scheme for classifying packets of the particular packet flow in a manner that is different than that of the initial packet classification scheme.

5. The method of claim 1, wherein the reply signal directs the data communications device to cancel the scheme change, and further comprising:
   canceling the scheme change in response to the reply signal.

6. The method of claim 5 wherein transferring the packets includes:
   transferring packets of the particular packet flow having a first priority prior to the step of receiving the reply signal; and
   transferring packets of the particular packet flow having a second priority that is different than the first priority after the step of receiving the reply signal.

7. The method of claim 5 wherein transferring the packets includes:
   transferring packets of the particular packet flow having a first size prior to the step of receiving the reply signal; and transferring packets of the particular packet flow having a second size that is different than the first size after the step of receiving the reply signal.

8. The method of claim 5, further comprising:
in response to the reply signal, attempting to plan the scheme change for a packet flow that is different than the particular packet flow.

9. The method of claim 1, wherein the reply signal accepts the scheme change, and further comprising:
changing, in response to the reply signal, the initial policy scheme to the new policy scheme such that packets of the particular packet flow subsequently are transferred based on the new policy scheme rather than the initial policy scheme.

10. The method of claim 1, further comprising:
detecting an occurrence of a timeout condition indicating that, since the change signal was provided, a timeout period has elapsed without receiving the reply signal from the source; and
changing, in response to the occurrence of the timeout condition, the initial policy scheme to the new policy scheme such that packets of the particular packet flow subsequently are transferred based on the new policy scheme rather than the initial policy scheme.

11. The method of claim 1 wherein the change signal includes a query field containing a confirmation code, and wherein accepting the reply signal from the source includes:
receiving the reply signal from the source;
authenticating the reply signal based on a comparison of contents of a query field of the reply signal with the confirmation code.

12. A data communications device for managing a flow of packets, comprising:
a transfer circuit that transfers packets of a particular packet flow from input ports to output ports of the data communications device based on an initial policy scheme controlling an initial manner in which the packets are transferred from the input ports to the output ports of the data communications device;
a controller, coupled to the transfer circuit, that plans a scheme change to change the initial policy scheme to a new policy scheme in response to a particular transfer condition within the data communications device existing while the transfer circuit transfers the packets of the particular flow based on the initial policy scheme. the new policy scheme controlling a new manner in which the packets are transferred from the input ports to the output ports of the data communications device; and
a feedback circuit, coupled to the controller, that provides a change signal to a source of the particular packet flow, the change signal indicating that the data communications device has planned the scheme change,
wherein the data communications device is a first computerized node of a network, the source of the particular packet flow is a second computerized node of the network coupled to the first computerized node by a packet transmission medium, and the feedback circuit is operative when providing the change signal to cause the transmission of a change signal packet into the network destined for the second computerized node,
and wherein the feedback circuit is further operative to:
accept a reply signal from the source; and
instruct the controller to (1) change the initial policy scheme to the new policy scheme when contents within a reply field of the reply signal represent a first value, and (2) maintain the initial policy scheme when the contents within the reply field of the reply signal represent a second value that is different than the first value.

13. The data communications device of claim 12 wherein the initial policy scheme is an initial packet dropping scheme for dropping packets from the particular packet flow, and wherein the new policy scheme is a new packet dropping scheme for dropping packets from the particular packet flow in a manner that is different than that of the initial packet dropping scheme.

14. The data communications device of claim 12 wherein the initial policy scheme is an initial packet scheduling scheme for scheduling packets of the particular packet flow for transmission, and wherein the new policy scheme is a new packet scheduling scheme for scheduling packets of the particular packet flow for transmission in a manner that is different than that of the initial packet scheduling scheme.

15. The data communications device of claim 12 wherein the initial policy scheme is an initial packet classification scheme for classifying packets of the particular packet flow, and wherein the new policy scheme is a new packet classification scheme for classifying packets of the particular packet flow in a manner that is different than that of the initial packet classification scheme.

16. The data communications device of claim 12 wherein the reply signal directs the data communications device to cancel the scheme change, and the feedback circuit is configured to:
instruct the controller to cancel the scheme change in response to the reply signal.

17. The data communications device of claim 16 wherein the transfer circuit, under direction of the controller, (i) transfers packets of the particular packet flow having a first priority prior to receipt of the reply signal, and (ii) transfers packets of the particular packet flow having a second priority that is different than the first priority after receipt of the reply signal.

18. The data communications device of claim 16 wherein the transfer circuit, under direction of the controller, (i) transfers packets of the particular packet flow having a first size prior to receipt of the reply signal, and (ii) transfers packets of the particular packet flow having a second size that is different than the first size after receipt of the reply signal.

19. The data communications device of claim 16 wherein the controller, in response to the reply signal, is configured to attempt to plan the scheme change for a packet flow that is different than the particular packet flow.

20. The data communications device of claim 12 wherein the reply signal accepts the scheme change and the feedback circuit is configured to:
instruct the controller to change, in response to the reply signal, the initial policy scheme to the new policy scheme such that the transfer circuit transfers packets of the particular packet flow based on the new policy scheme rather than the initial policy scheme.

21. The data communications device of claim 12 wherein the feedback circuit is configured to:
(i) detect an occurrence of a timeout condition indicating that, since the change signal was provided, a timeout period has elapsed without receiving the reply signal from the source; and
(ii) instruct the controller to change, in response to the occurrence of the timeout condition, the initial policy scheme to the new policy scheme such that packets of the particular packet flow subsequently are transferred based on the new policy scheme rather than the initial policy scheme.

22. A data communications device for managing a flow of packets, comprising:
- a transfer circuit that transfers packets of a particular packet flow from input ports to output ports of the data communications device based on an initial policy scheme controlling an initial manner in which the packets are transferred from the input ports to the output ports of the data communications device;
- a controller, coupled to the transfer circuit, that plans a scheme change to change the initial policy scheme to a new policy scheme in response to a particular transfer condition within the data communications device existing while the transfer circuit transfers the packets of the particular flow based on the initial policy scheme, the new policy scheme controlling a new manner in which the packets are transferred from the input ports to the output ports of the data communications device; and
- feedback means for providing a change signal to a source of the particular packet flow, the change signal indicating that the data communications device has planned the scheme change,
- wherein the data communications device is a first computerized node of a network, the source of the particular packet flow is a second computerized node of the network coupled to the first computerized node by a packet transmission medium, and the feedback means is operative when providing the change signal to cause the transmission of a change signal packet into the network destined for the second computerized nodes
- and wherein the feedback means is further operative to:
  - accept a reply signal from the source; and
  - instruct the controller to (1) change the initial policy scheme to the new policy scheme when contents within a reply field of the reply signal represent a first value, and (2) maintain the initial policy scheme when the contents within the reply field of the reply signal represent a second value that is different than the first value.

23. The data communications device of claim 22 wherein the initial policy scheme is an initial packet dropping scheme for dropping packets from the particular packet flow, and wherein the new policy scheme is a new packet dropping scheme for dropping packets from the particular packet flow in a manner that is different than that of the initial packet dropping scheme.

24. The data communications device of claim 22 wherein the initial policy scheme is an initial packet scheduling scheme for scheduling packets of the particular packet flow for transmission, and wherein the new policy scheme is a new packet scheduling scheme for scheduling packets of the particular packet flow for transmission in a manner that is different than that of the initial packet scheduling scheme.

25. The data communications device of claim 22 wherein the initial policy scheme is an initial packet classification scheme for classifying packets of the particular packet flow, and wherein the new policy scheme is a new packet classification scheme for classifying packets of the particular packet flow in a manner that is different than that of the initial packet classification scheme.

26. The data communications device of claim 22 wherein the reply signal directs the data communications device to cancel the scheme change, and the feedback means includes:
- means for instructing the controller to cancel the scheme change in response to the reply signal.

27. The data communications device of claim 26 wherein the transfer circuit, under direction of the controller, (i) transfers packets of the particular packet flow having a first priority prior to receipt of the reply signal, and (ii) transfers packets of the particular packet flow having a second priority that is different than the first priority after receipt of the reply signal.

28. The data communications device of claim 26 wherein the transfer circuit, under direction of the controller, (i) transfers packets of the particular packet flow having a first size prior to receipt of the reply signal, and (ii) transfers packets of the particular packet flow having a second size that is different than the first size after receipt of the reply signal.

29. The data communications device of claim 26 wherein the controller, in response to the reply signal, is configured to attempt to plan the scheme change for a packet flow that is different than the particular packet flow.

30. The data communications device of claim 22 wherein the reply signal accepts the scheme change, and the feedback means includes:
- means for instructing the controller to change, in response to the reply signal, the initial policy scheme to the new policy scheme such that the transfer circuit transfers packets of the particular packet flow based on the new policy scheme rather than the initial policy scheme.

31. The data communications device of claim 22 wherein the feedback means includes:
- (i) means for detecting an occurrence of a timeout condition indicating that, since the change signal was provided, a timeout period has elapsed without receiving the reply signal from the source; and
- (ii) means for instructing the controller to change, in response to the occurrence of the timeout condition, the initial policy scheme to the new policy scheme such that packets of the particular packet flow subsequently are transferred based on the new policy scheme rather than the initial policy scheme.

32. The data communications device of claim 22 wherein the feedback means includes:
- means for enabling the controller to process the scheme change based on one of (i) the reply signal from the source, and (ii) an absence of the reply signal from the source.

* * * * *

UNITED STATES PATENT AND TRADEMARK OFFICE
CERTIFICATE OF CORRECTION

PATENT NO. : 7,477,601 B1  Page 1 of 1
APPLICATION NO. : 10/635116
DATED : January 15, 2009
INVENTOR(S) : John G. Waclawsky and Hamesh Chawla

It is certified that error appears in the above-identified patent and that said Letters Patent is hereby corrected as shown below:

Claim 13, Column 17, Line 45, "particular flow based on th einitial policy scheme. the" should read --particular flow based on the initial policy scheme, the--.

Claim 22, Column 19, Line 29, "tined for the second computerized nodes;" should read --tined for the second computerized node;--.

Signed and Sealed this

Tenth Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,477,601 B1 | Page 1 of 1 |
| APPLICATION NO. | : 10/635116 | |
| DATED | : January 13, 2009 | |
| INVENTOR(S) | : John G. Waclawsky and Hamesh Chawla | |

It is certified that error appears in the above-identified patent and that said Letters Patent is hereby corrected as shown below:

Claim 13, Column 17, Line 45, "particular flow based on th einitial policy scheme. the" should read --particular flow based on the initial policy scheme, the--.

Claim 22, Column 19, Line 29, "tined for the second computerized nodes;" should read --tined for the second computerized node;--.

This certificate supersedes the Certificate of Correction issued March 10, 2009.

Signed and Sealed this

Thirty-first Day of March, 2009

JOHN DOLL
*Acting Director of the United States Patent and Trademark Office*